July 4, 1933.  W. S. EDGE  1,916,563
CONSTRUCTION OF CONCRETE PAVEMENTS
Filed Dec. 14, 1928  3 Sheets-Sheet 1
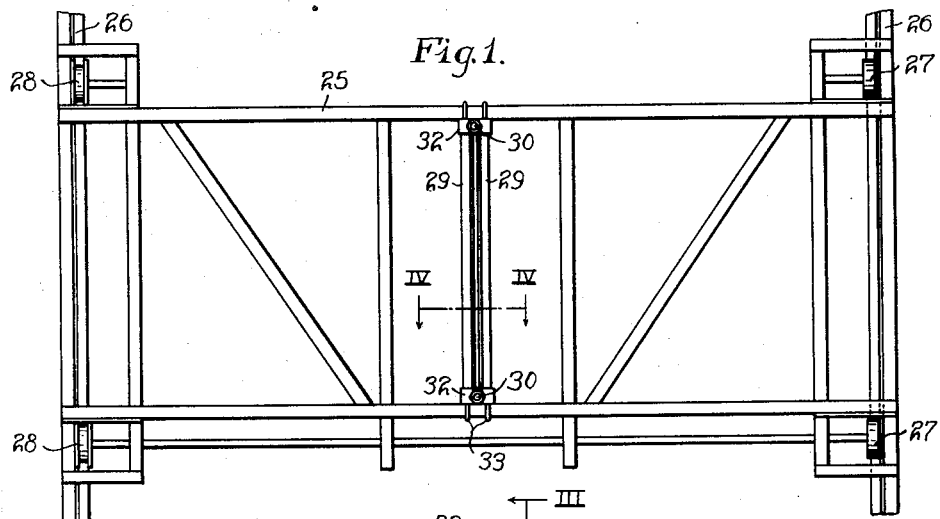
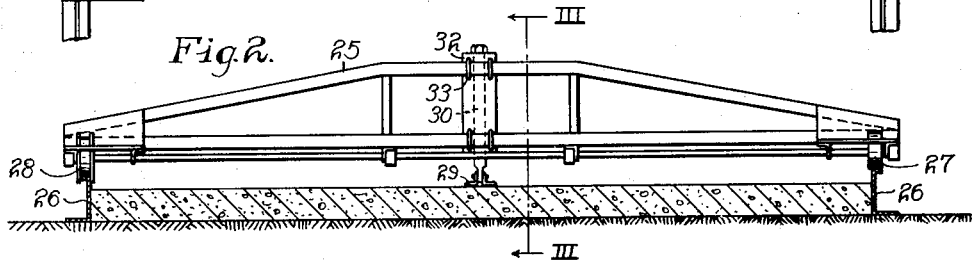
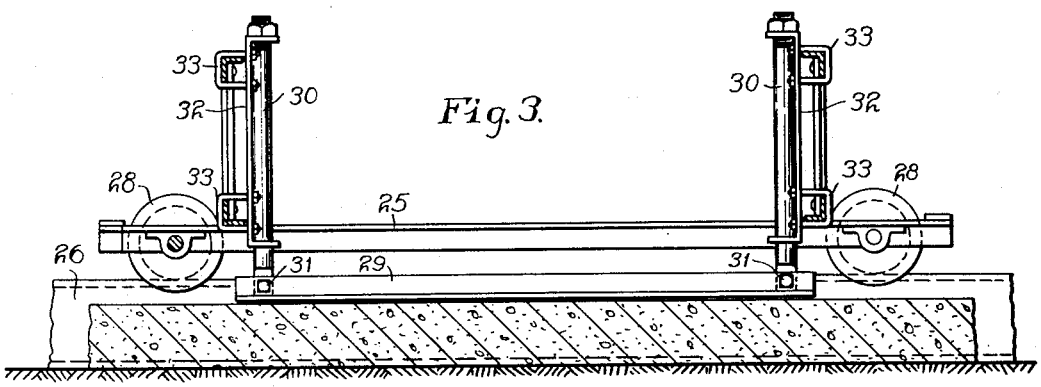
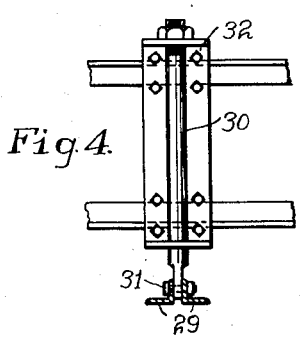
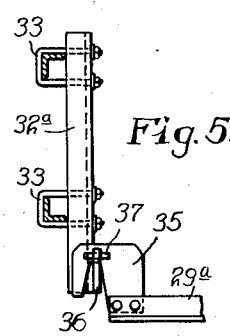
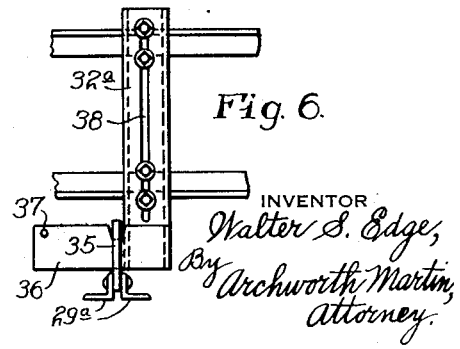

July 4, 1933. W. S. EDGE 1,916,563
CONSTRUCTION OF CONCRETE PAVEMENTS
Filed Dec. 14, 1928 3 Sheets-Sheet 2
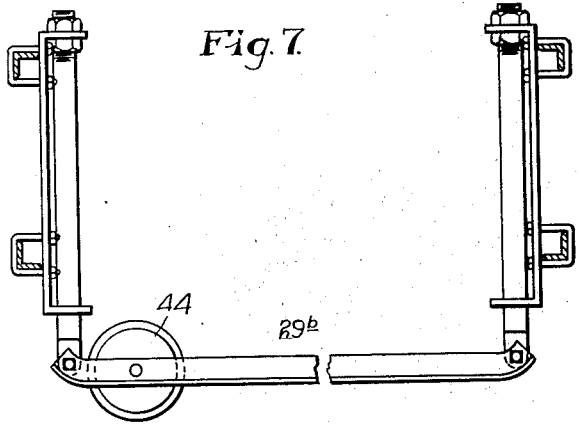
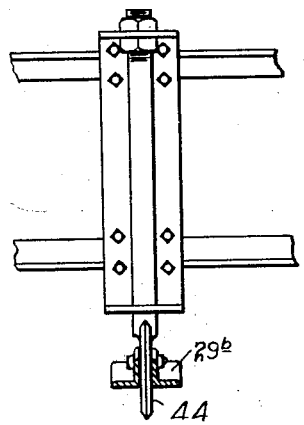
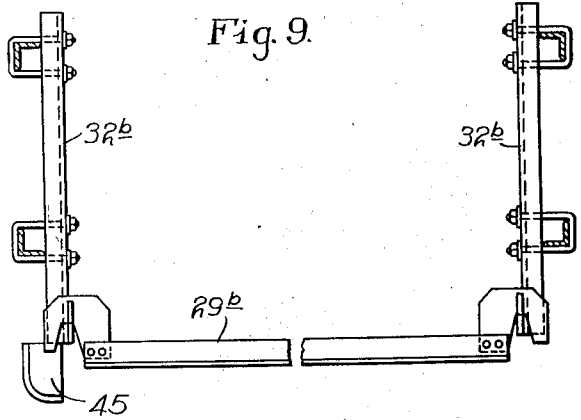
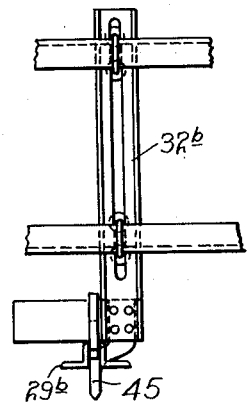
INVENTOR
Walter S. Edge,
By Archworth Martin,
Attorney.

July 4, 1933.                W. S. EDGE                1,916,563
                CONSTRUCTION OF CONCRETE PAVEMENTS
                Filed Dec. 14, 1928        3 Sheets-Sheet 3
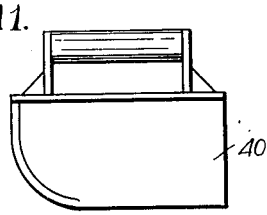  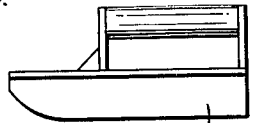 
Fig.11.  Fig.12.  Fig.13.  Fig.14.
 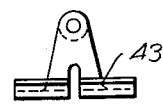
Fig.15.  Fig.16.
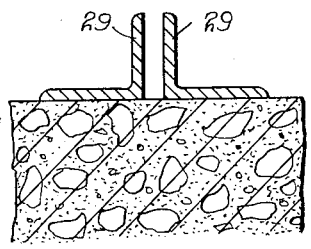 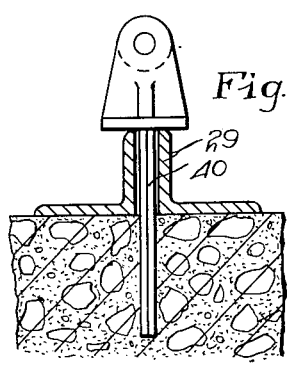 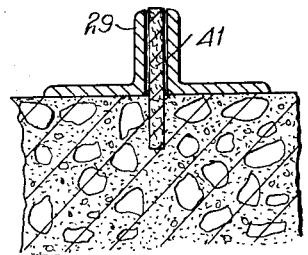
Fig.17.  Fig.18.  Fig.19.
 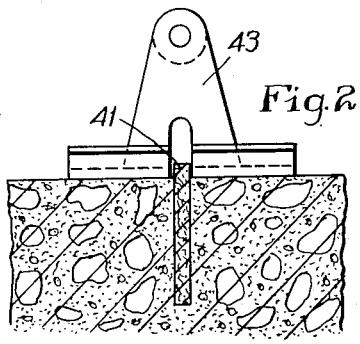 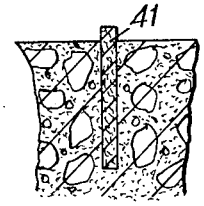
Fig.20.  Fig.21.  Fig.22.
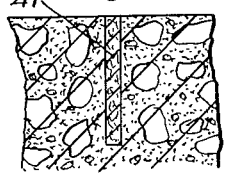 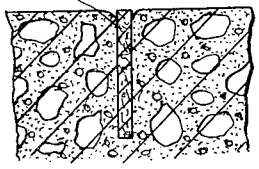
Fig.23.  Fig.24.
INVENTOR
Walter S. Edge,
By Archworth Martin,
Attorney.

Patented July 4, 1933

1,916,563

UNITED STATES PATENT OFFICE

WALTER S. EDGE, OF PITTSBURGH, PENNSYLVANIA, ASSIGNOR TO NATIONAL STEEL FABRIC COMPANY, OF PITTSBURGH, PENNSYLVANIA, A CORPORATION OF PENNSYLVANIA

CONSTRUCTION OF CONCRETE PAVEMENTS

Application filed December 14, 1928. Serial No. 326,117.

My invention relates to the construction of concrete roadways and the like, and more particularly to an improved means for forming slots therein and installing asphalt or other joint material in the said slots.

One object of my invention is to provide a means and a method whereby slots in concrete roadways or other pavements may be accurately and quickly formed or straightened.

Another object of my invention is to provide a means and a method for inserting pre-cast asphalt or other joint material into the said slots, or into plastic concrete which does not contain a slot.

Still another object of my invention is to simplify and improve generally the formation of expansion joints in concrete.

While the procedure as hereinafter described contemplates the forming of a slot in the concrete for the reception of pre-cast joint material of asphalt or the like, it will be understood that by the use of the apparatus shown, such pre-cast material can be forced into the concrete, while the concrete is plastic, particularly in those cases where the coarse aggregate has been displaced and only the finer particles and grout remain in the vicinity of the line of the joint.

Also, the invention is designed for use in roadways wherein partial-depth joints are employed to produce a "weakened plane", as well as in roadways where full depth joints are desired.

Heretofore, where pre-cast asphalt joint strips have been inserted in roadways, it has frequently been the practice to employ in connection with said strips a sheet-metal channel which embraces the upper edge of the strip or straps of metal partially imbedded in the sides of said strips, to stiffen the strips and to facilitate the handling thereof when forcing them into place. By my invention, these auxiliary metallic stiffening or supporting members are not required.

Some of the means by which my invention may be practised are shown in the accompanying drawings, wherein Figure 1 is a plan view of a finishing bridge with which my apparatus may be employed; Fig. 2 is an end elevational view thereof; Fig. 3 is a view taken on the line III—III of Fig. 2; Fig. 4 is a view taken on the line IV—IV of Fig. 1; Figs. 5 and 6 are side and end elevational views, respectively, showing a modification of a portion of the apparatus of Figs. 1 to 4; Figs. 7 and 8 are side and cross sectional views respectively of another modification showing the manner in which the cutter may be employed in connection with the apparatus of Figs. 1 to 4; Figs. 9 and 10 are side and end elevational views respectively, showing the manner in which a cutter may be employed in connection with the structure of Figs. 5 and 6;

Figs. 11 and 12 are side and end elevational views respectively, of a slot cutting or slot-straightening tool; Figs. 13 and 14 are side and end elevational views respectively, of a tool for forcing the plastic material into place in the concrete; Figs. 15 and 16 are side and end elevational views respectively, showing a finishing tool for use on the concrete after the joint has been inserted; Fig. 17 is a cross sectional view showing the gage bar in place upon the concrete and before a slot has been formed in the concrete; Fig. 18 is a similar view showing the slot-forming tool in place in the gage and in position to be moved through the concrete to form the slot; Fig. 19 shows the asphalt joint partially inserted into the concrete; Fig. 20 shows the manner in which the joint is forced into place in the concrete by the tool of Fig. 13; Fig. 21 shows a manner in which the concrete adjacent to the line of the joint is finished by the smoothing tool of Fig. 15; Fig. 22 shows the joint in place with all of the tools removed; Fig. 23 shows the completed road section with the protruding portion of the joint of Fig. 22 cut away, and Fig. 24 shows the manner in which the concrete may be rounded off at the corners alongside the inserted joint.

Referring now to Figs. 1 to 4, I show a finishing bridge 25 which may be of somewhat the usual form and which is mounted upon side forms 26 that also serve as tracks for the wheels 27 and 28 of the bridge. The wheels 28 are provided with double flanges while the wheels 27 have their treads flat.

The parts thus far referred to may be of any well-known form.

Disposed parallel of the tracks or side frames 26, I provide a guide or gage that is mounted upon the bridge 25 in parallelism with and above the line of the joint which it is desired to form in the concrete. This guide bar structure is composed of two angle bars 29 that are spaced apart a distance slightly greater than the thickness of the joint strip which it is desired to place in the roadway. The ends of the bars are supported from rods 30 whose lower ends extend between and are secured to the angles 29, by bolts 31. The rods 30 extend through the upper and lower flanges of brackets 32 and are supported thereby for vertical sliding movement with respect to the bridge.

The rods 30 are freely slidable in the brackets 32 to permit of conveniently raising the guide 29 out of contact with the concrete, the guide normally resting lightly upon the concrete by reason of its weight. Vertical adjustment of the guide is effected by means of nuts threaded on the upper ends of the rods 30. The brackets 32 are rigidly secured to the framework of the bridge by means of U-bolts 33 which embrace certain of the transverse bars of the framework.

In Figs. 5 and 6, I show a modification, wherein the guide bars 29a are supported from the framework by brackets 32a that correspond to the brackets 32 of Fig. 4. In this form of apparatus, the bars 29a have hooks 35 which engage notches in transversely-extending bracket arms 36 that are in turn fastened to the brackets 32a. By this arrangement, the guide bars 29a can have slight vertical movement without disengagement of the hooks 35 from the slots in the bracket arms, and upon further lifting movement of the guide bars, they can be slid along the bracket arms 36 until they engage the stop pins 37 whereupon the joint is exposed for performing the finishing operations thereon.

The brackets 32a have slots 38 which permit of their vertical adjustment on the bridge, the U-bolts 33 extending through said slots and around certain of the frame members of the bridge.

The procedure followed in placing joint material in the roadways with the apparatus of Figs. 1 to 6 is as follows:—Assuming the concrete to be in a plastic condition, the finishing bridge is placed above that portion thereof into which it is desired to place the joint material with the gage 29 resting upon the plastic concrete as shown in Fig. 17. A cutting tool 40 (Figs. 11, 12 and 18) is then forced into the concrete and moved longitudinally of the guide 29, to form or open a slot for the reception of a strip 41 of asphalt or other suitable material.

In case a slot has been previously formed in the concrete, the tool 40, guided by the gage 29, will serve to correct any irregularities in the slot and to reopen the same in case it has become partially filled with concrete.

The tool 40 is then removed and the joint strip 41 then inserted approximately to the position as shown in Fig. 19. Thereupon the seating tool 42 of Fig. 13 is employed to force the strip 41 into the concrete, as shown in Fig. 20. The walls of the vertical slot in the gage 29 serve to support the sides of the strip 41 while it is being forced into the concrete. If the coarse aggregate of the concrete has been displaced as shown in Fig. 19 below the lower edge of the strip 41, or the concrete is sufficiently soft, it is not necessary that a slot be actually present in the concrete in order to permit the insertion of the strip 41.

After the tool 42 has been removed and the gage 29 taken away, the finishing tool or float 43 is utilized as shown in Fig. 21 to finish and smooth the concrete surfaces in the vicinity of the asphalt joint, the tool being shown as having a groove for the reception of the protruding edge of the strip.

In cases where the strip 41 is set into the concrete with its upper edge flush with the surface of the concrete, a quarter round tool may be employed to round off and finish the corners of the concrete at the sides of the strip, in a manner well-known in the art.

Referring now to Figs. 7 and 8, I show a structure wherein a cutting or slot-forming wheel 44 is supported from the bridge as is the gage 29 of Figs. 1 to 4. As the bridge is moved forward, the cutter 44 cuts or opens up a groove in the concrete, thereby reducing the labor of installing the joint material. The wide horizontal flanges of the gage, contacting with the surface of the concrete, prevents the breaking up of the finished surface through movement of the cutter.

In Figs. 9 and 10, I show a cutter blade or slot-opening member 45 that is secured to the lower ends of brackets 32b which correspond to the brackets 32 of Figs. 5 and 6, the gage 29b corresponding to the gage 29a. The blade 45 will serve to cut or open a slot during traveling movement of the bridge as in the case of the wheel 44, and also results in a saving in the labor of installation.

While I have described the insertion of an asphalt strip, it will be understood that the apparatus may be employed for the installation of various other joint materials such as card board, paper, felt, etc., either in short lengths or as continuous strips fed from a roll, which strips may be inserted into the concrete either by hand or by a tool.

I claim as my invention:—

1. Apparatus for producing a joint in concrete, comprising a supporting framework to be positioned over a concrete surface, a guide member, and means for loosely supporting the said member upon the framework for vertically sliding movement to permit said member to rest upon the concrete.

2. Apparatus for producing a joint in concrete, comprising a supporting framework to be positioned over a concrete surface, a guide member, means for loosely supporting the said member upon the framework for vertically sliding movement to permit said member to rest upon the concrete, and means permitting lateral movement of said member upon its support when it has been raised a predetermined distance.

3. Apparatus for producing a joint in concrete comprising a supporting framework to be positioned over a concrete surface, a guide member, means for supporting said member for vertical and horizontally lateral movement on the framework, and means for preventing lateral movement of said member when adjacent to its lowermost position.

WALTER S. EDGE.